United States Patent [19]

Kumar

[11] E Patent Number: Re. 32,502

[45] Reissued Date of Patent: Sep. 15, 1987

[54] GROUNDING MATING HARDWARE

[75] Inventor: Vijay Kumar, Harrisburg, Pa.

[73] Assignee: AMP Incorporated, Harrisburg, Pa.

[21] Appl. No.: 783,985

[22] Filed: Oct. 3, 1985

Related U.S. Patent Documents

Reissue of:

[64] Patent No.: 4,512,618
Issued: Apr. 23, 1985
Appl. No.: 473,935
Filed: Mar. 10, 1983

[51] Int. Cl.[4] ..... H01R 4/66; H01R 13/648

[52] U.S. Cl. ..... 439/92; 439/607

[58] Field of Search ..... 339/14 R, 17 F, 17 L, 339/17 LC, 136 R, 136 M, 143 R, 176 M, 176 MF, 176 MP, 92 M

[56] References Cited

U.S. PATENT DOCUMENTS

| | | | |
|---|---|---|---|
| 2,790,153 | 4/1957 | Arson | 339/184 |
| 3,566,366 | 2/1971 | Johnson et al. | 339/91 |
| 3,569,915 | 3/1971 | Sorensen et al. | 339/143 R |
| 3,670,292 | 6/1972 | Tracy | 339/143 R |
| 3,670,409 | 6/1972 | Reimer | 29/625 |
| 3,703,701 | 11/1972 | Zimmerman | 339/221 R |
| 3,786,399 | 1/1974 | McHattie | 339/14 R |
| 3,810,069 | 5/1974 | Jaconette, Jr. | 339/14 R |
| 3,825,874 | 7/1976 | Peverill | 339/14 R |
| 3,854,107 | 12/1974 | Tuchto et al. | 339/79 |
| 4,020,430 | 4/1977 | Vander Heyden | 339/143 R X |
| 4,337,989 | 7/1982 | Asick et al. | 339/143 R |
| 4,371,226 | 2/1983 | Brancaleone | 339/143 R X |
| 4,386,814 | 6/1983 | Asick | 339/143 R X |
| 4,418,972 | 12/1983 | Benasutti | 339/176 MP X |

*Primary Examiner*—Gil Weidenfeld
*Assistant Examiner*—Steven C. Bishop
*Attorney, Agent, or Firm*—F. Brice Faller; Bruce J. Wolstoncroft; David L. Smith

[57] ABSTRACT

Hardware for providing a grounding interconnect for a standard connector is formed by a single metallic member which is stamped and formed to enclose a mating face of the connector and extend across at least mounting portions of a mounting face with the metal member being provided with profiled apertures receiving therein a wiping contacting engagement a mounting and locking means for the connector.

7 Claims, 6 Drawing Figures

GROUNDING MATING HARDWARE

Matter enclosed in heavy brackets [ ] appears in the original patent but forms no part of this reissue specification; matter printed in italics indicates the additions made by reissue.

The present invention pertains to a means for providing a grounding interface for a high density miniature electrical connector, and in particular one in which does not increase the number of component parts required.

U.S. Pat. No. 2,790,153 shows an electrical connector of the type which is known throughout the electrical connector industry as a miniature or sub-miniature D connector. The connector comprises plug and receptacle portions, each having an insulative housing containing a plurality of mating terminals and an exterior metal shell enclosing the housings and making an interconnect when the plug and receptacle members are mated. There have been many design variations from this basic concept but they all are relatively similar.

The recent increase in electronic activity has caused the creation of new regulations regarding shielding against RF/EM interference. This is primarily accomplished by utilizing shielded cables and creates the requirement for means to effectively ground the shielding through a connector to a circuit board, panel, or the like when intermating is effected.

The present invention satisfies the need for an effective grounding of a connector housing without increasing or duplicating the number of parts that are needed. The present invention is used in combination with an electrical connector having a housing of insulative material with a plurality of terminals mounted in the housing opening onto a mating face and extending from a mounting face of the housing. The housing includes mounting means extending from the mounting face and locking means extending from the mating face. The present invention comprises a metal shield having a flange portion surrounding the periphery of the mating face in close cooperation therewith, a profiled aperture including at least one inwardly directed [tab] *tine* adapted to make wiping engagement with the mounting means and at least one second aperture having an inwardly directed [tab] *tine* adapted to make a wiping contact with the locking means.

An embodiment of the present invention will now be described by way of example with reference to the accompanying drawings, in which.

Figures 1, 2, 3:
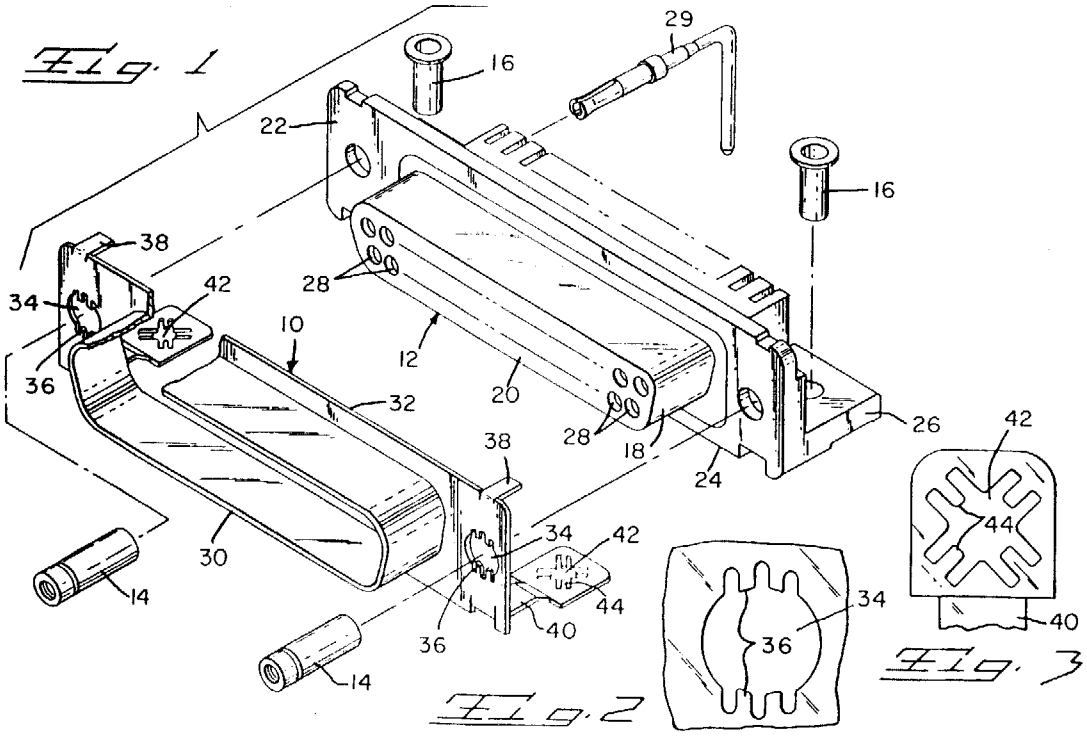
FIG. 1 is an exploded perspective view, partially in section, of the subject invention and a known connector.
FIG. 2 is a plan view of a fragment of the subject invention showing the locking means hole.
FIG. 3 is a plan view of a fragment of the subject invention showing the mounting means hole.
Figure 4:
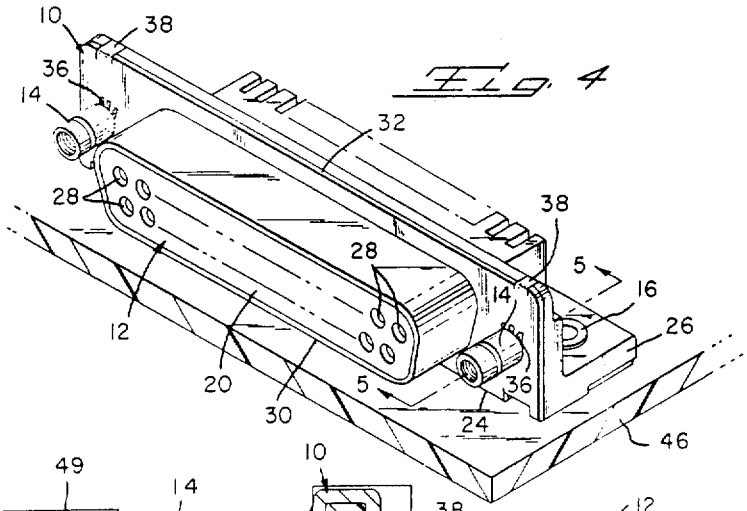
FIG. 4 is a perspective view of the subject invention in a fully assembled condition.

The subject grounding shield 10 is used in cooperation with a known electrical connector 12 which is provided with locking hardware 14 and mounting hardware 16. The connector is formed by a housing 18 of rigid insulative material defining a mating face 20 surrounded by an integral peripheral mating flange 22, and a mounting face 24 having mounting flanges 26 at opposite ends thereof extending normal to flange 22. The connector housing 18 also defines a plurality of terminal passages 28 extending between the mating and mounting faces 20, 24. An appropriate electrical terminal 29 is mounted in each passage with a mating portion directed towards the mating face and a mounting portion extending from the mounting face.

The subject ground shell 10 is a stamped and formed metal member having a shroud portion 30 with an integral peripheral flange 32 extending from one end thereof normal to the axis of the shroud portion. The flange 32 includes at least one profiled locking hardware aperture 34, shown in plan view in FIG. 2, each of which includes at least one inwardly directed tine 36. At least one [latching] tab 38 extends from one edge of the flange 32 while at least one [mounting tab] *ground strap* 40 extends from the opposite edge. The [tab] *strap* 40 includes a profiled aperture 42, shown in plan view in FIG. 3, having a plurality of inwardly directed tines 44.

Figure 5:
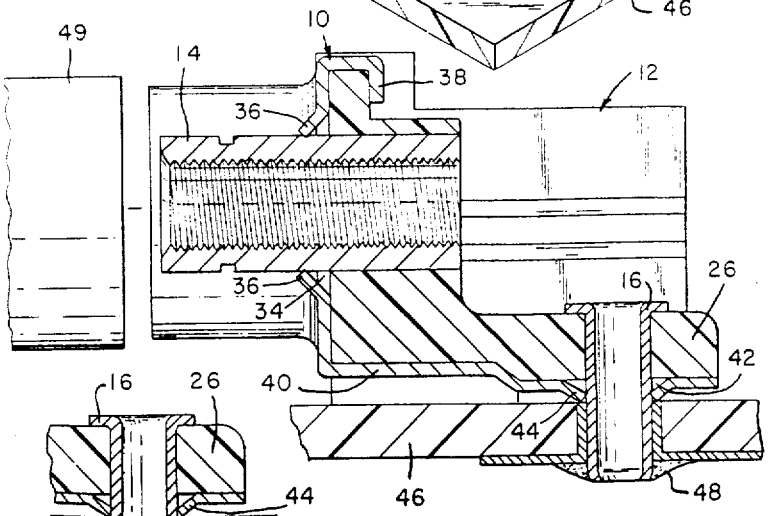
FIG. 5 is a transverse section taken along line 5—5 of FIG. 4.
Figure 6:
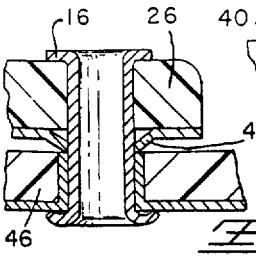
FIG. 6 is a transverse section, similar to FIG. 5, showing an alternate embodiment of the present invention.

The connector 12 is formed by first molding the housing, mounting the terminals therein in standard fashion, and mounting the locking hardware 14 in respective apertures in the flange 22 by heat staking, ultrasonic bonding, insert molding or other known techniques. The subject ground shield 10 is then applied over the mating face 20 of the connector and the [tines] *tabs* 38 are crimped to engage the flange 22. As the shield 10 is applied, the tines 36 will be bent by wiping engagement with the locking hardware 14 but will maintain adequate electrical and mechanical contact therewith. The apertures 42 will be correctly positioned beneath the mounting flanges 26 and will receive the mounting hardware 16 therein in wiping engagement, much the same manner as the locking hardware. The completed assembly can be fixed to an edge portion of a circuit board or the like and secured thereto by solder 48, as shown in FIG. 5, to receive a shielded connector 49. FIG. 6 shows a slightly different version which the mounting hardware 16 is crimped or clinched to secure the connector 12 to the circuit board 46.

I claim:

1. [In combination with an] *An* electrical connector having a housing of rigid insulative material defining a mating face and a mounting face with a plurality of terminal passages extending between the faces, a peripheral flange around said mating face and mounting flanges on said mounting face, each said peripheral and mounting flange being provided with at least one hole to receive locking and mounting means, respectively, therein, a plurality of electrical terminals mounted in said housing, each terminal having a mating portion directed toward the mating face and a mounting portion extending from the mounting face, a metal shell providing grounding interconnect between a *complementary* shielded connector and [the] *a* mounting surface [characterized by a unitary metallic member], *said metal shell* having a shroud portion encircling the mating face to engage shielding of said *complementary* shielded connector [and], an integral flange extending normal to [the axis of] the shroud portion, [at least one mounting tab extending from a first edge of said flange adapted to engage one edge of said peripheral flange of said housing] and at least one [mounting tab] *ground strap* adapted to lie adjacent said mounting face, [each] *characterized by* said *integral* flange and said [mounting tab] *ground strap* being provided with [a profiled aperture providing] *an aperture having inwardly directed tines which provide* wiping engagement between the shell and the respective locking means and mounting means.

[2. A metal shell providing grounding interconnect between a mating shielded connector and a mounting surface of an electrical connector comprising a unitary metallic member having a shroud portion profiled to encircle said mating face of said connector to engage said shielded connector and an integral peripheral flange extending normal to the axis of said shroud portion, at least one mounting tab extending from one edge of said flange and adapted to engage an edge of said connector and at least one mounting tab extending from an opposite edge of said flange and adapted to lie adjacent said mounting face, each said flange and said mounting tab being provided with a profiled aperture providing wiping engagement between the shell and the respective locking means and mounting means.]

*3. An electrical connector for mounting to a mounting surface such as a printed circuit board, comprising:*

*an insulative housing having a mating face surrounded by a mating flange and a mounting face having mounting flange means for reception against said mounting surface,*

*a stamped and formed metal shell having a shroud portion about said mating face, an integral flange against said mating flange, and ground strap means extending from an edge of said integral flange and against said mounting flange means to face said mounting surface, said strap means having an aperture with inwardly directed tines,*

*mounting hardware extending through an aperture in each said mounting flange means and the respective aperture of the ground strap means, said tines engaging said mounting hardware to make electrical contact therewith and to retain said hardware in the flange, whereby,*

*upon mounting said connector to a printed circuit board, grounding will be provided between the printed circuit board and the shielding of a shielded connector mated to said mating face.*

*4. An electrical connector as in claim 3 wherein said integral flange has aperture means, said aperture means having inwardly directed tines, said connector further comprising locking hardware extending through an aperture in said mating flange and the respective aperture means of said integral flange, said tines engaging said locking hardware to make electrical contact therewith.*

*5. An electrical connector as in claim 3 wherein said shell further comprises at least one tab extending from an edge of said integral flange and engaging said mating flange of said housing.*

*6. An electrical connector for mounting to a mounting surface such as a printed circuit board, comprising:*

*an insulative housing having a mating face surrounded by a mating flange and a mounting face having mounting flange means for reception against the mounting surface,*

*a stamped and formed metal shell having a shroud portion about the mating face, an integral flange against the mating flange, and ground strap means extending from an edge of the integral flange and against the mounting flange means to face the mounting surface, the integral flange having aperture means with inwardly directed tines,*

*locking hardware extending through an aperture in the mating flange and the respective aperture means of the integral flange, the tines engaging the hardware to make electrical contact therewith.*

*7. An electrical connector as recited in claim 6 wherein each ground strap means has an aperture with inwardly directing tines, the connector further comprising mounting hardware extending through an aperture of each mounting flange means and the respective aperture of the ground strap means, the tines engaging the mounting hardware to make electrical contact therewith and to retain the mounting hardware in the flange.*

*8. An electrical connector as recited in claim 6 wherein the shell further comprises at least one tab extending from an edge of the integral flange and engaging the mating flange of the housing.*

* * * * *